Oct. 5, 1954 A. J. BALSHI Re. 23,882

STERILIZER FOR FEED BAGS AND OTHER ARTICLES

Original Filed Feb. 2, 1949 2 Sheets-Sheet 1

INVENTOR.
A. J. Balshi
BY
ATTORNEY

STERILIZER FOR FEED BAGS AND OTHER ARTICLES

Original Filed Feb. 2, 1949 2 Sheets-Sheet 2

INVENTOR.
A. J. Balshi
BY
Emory R. Hoff
ATTORNEY

Reissued Oct. 5, 1954

Re. 23,882

UNITED STATES PATENT OFFICE 23,882

STERILIZER FOR FEED BAGS AND OTHER ARTICLES

Andrew J. Balshi, Catawissa, Pa.

Original No. 2,590,367, dated March 25, 1952, Serial No. 74,099, February 2, 1949. Application for reissue November 2, 1953, Serial No. 389,909

1 Claim. (Cl. 21—109)

Matter enclosed in heavy brackets [ ] appears in the original patent but forms no part of this reissue specification; matter printed in italics indicates the additions made by reissue.

This invention relates to sterilizers and is more particularly concerned with apparatus for the sterilization of items such as empty feed bags, cotton and wool batting, cotton seed and similar items.

A specific application of the present invention is in the field of animal husbandry where disease epidemics frequently result from the reuse of feed bags. After feed is delivered to a farm in bags, the bags may become contaminated with disease producing bacteria prevalent on the farm. When the bags are emptied and returned to a central source of feed supply, they are refilled and distributed generally. Hence, any bags which may have become contaminated with disease producing bacteria are a source of infection for healthy animals which may come in contact with the bags or with the feed placed therein.

Another specific application of this invention is in the treatment of cotton seed for the purpose of destroying the pink bollworm.

This invention may also be used for treating other materials *in a flattened spread out condition* for the purpose of destroying insects, fungi and other organisms economically injurious to man[.], *such as smuts.*

The general object of this invention is the provision of apparatus for sterilizing materials of the type mentioned and other materials in a simple and effective manner.

Another object is the provision of means for effecting sterilization of such materials rapidly and inexpensively.

In general, the apparatus of this invention comprises a pair of specially designed cooperating foraminous conveyor belts between which the material to be sterilized is fed. Means are provided for directing a sterilizing fluid against the material as it passes between the belts.

This invention will be more fully understood from the following description considered together with the accompanying drawing and further objects and advantages thereof will be apparent.

In the drawing:

Fig. 3 is a section along the line 3—3 of Fig 1.

Fig. 4 is an isometric view of a fragmentary portion of the cooperating belt conveyors and adjacent fluid carrying tubes.

Fig. 5 is a cross section of the same fragmentary elements illustrated in Fig. 4 showing a modified form of the invention.

Figure 1:
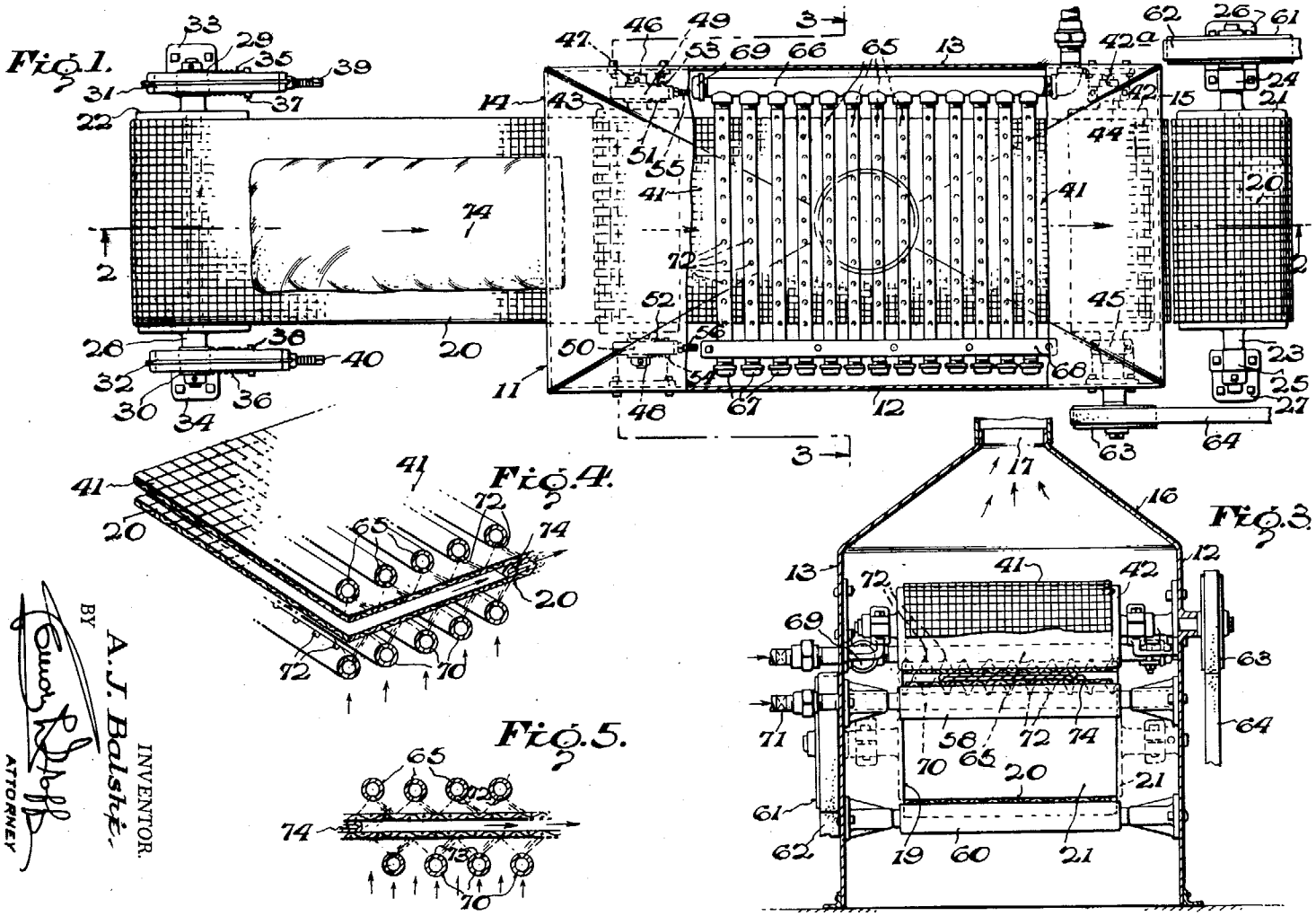
Fig. 1 is a top plan view of an embodiment of the invention partly broken away, with the enclosure member shown phantomatically.
Figure 2:
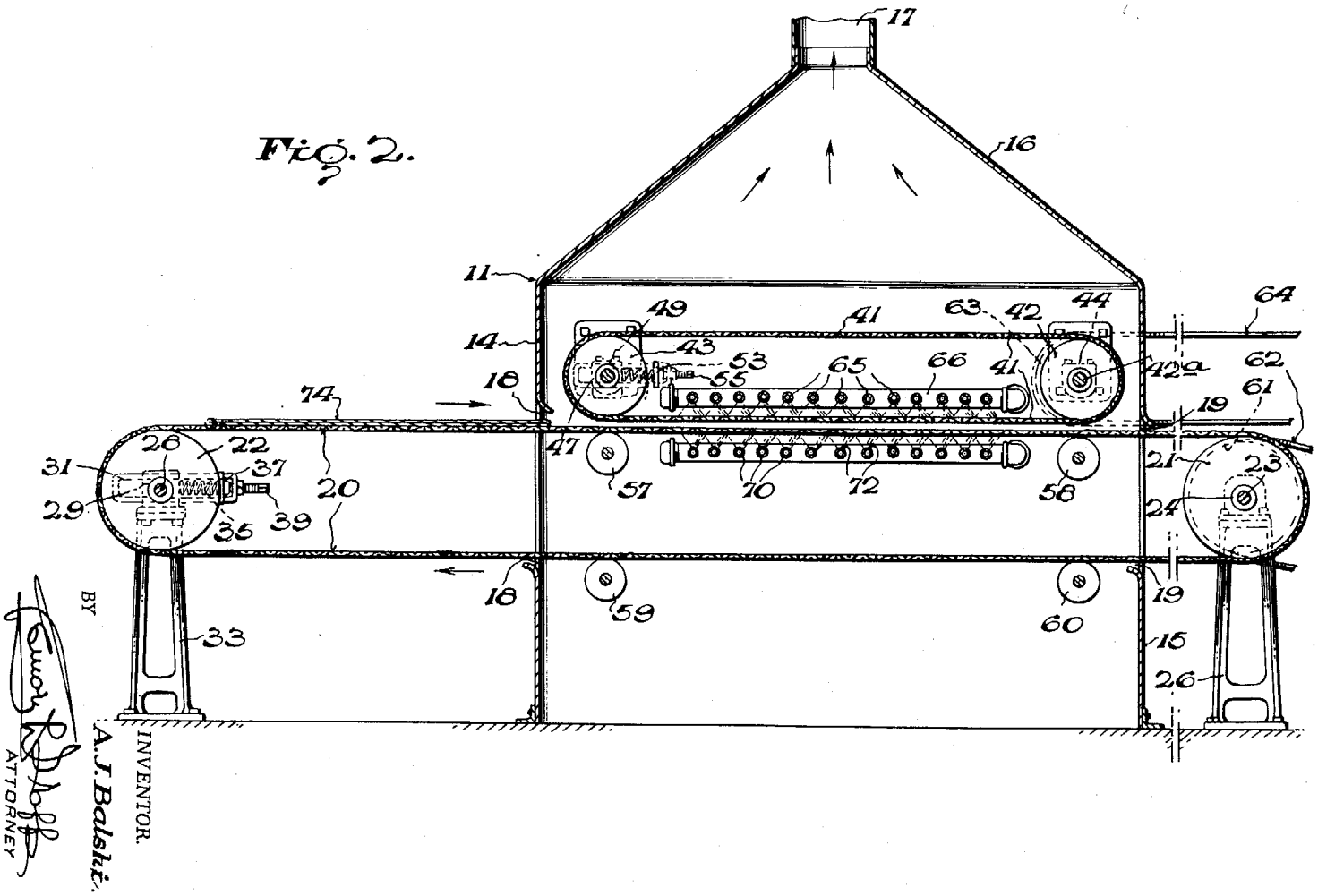
Fig. 2 is a section along the line 2—2 of Fig. 1.

Referring with more particularity to the drawing in which like numerals designate like parts, the embodiment illustrated comprises an enclosure 11 having side walls 12 and 13, end walls 14 and 15 and a hood roof 16. The roof is provided with a vent 17 for the escape of upwardly moving gases.

The end walls are provided with openings 18 and 19, respectively, through which there is longitudinally disposed a horizontal endless belt conveyor 20 supported at its ends on rollers 21 and 22. The conveyor belt is fabricated of a foraminous material, preferably of open mesh, such as wire screen. It is also preferred that the material have a relatively high coefficient of specific heat, such as that possessed by metals, such as steel, brass, copper, aluminum, Phosphor-bronze alloy and others.

The roller 21 is mounted on a shaft 23 which is rotatably mounted in pillow block bearings 24 and 25, fixed to pedestals 26 and 27, respectively.

The roller 22 is mounted on a shaft 28 which is rotatably mounted in horizontally movable pillow block bearings 29 and 30. This horizontal movement is provided by disposing the bearings 29 and 30 in horizontal slideways 31 and 32 at the top of pedestals 33 and 34. These bearings are biased outwardly under the force of compression springs 35 and 36 which are disposed between the inner end of the bearings and movable plates 37 and 38. Compression in the springs is adjustable by means of set screws 39 and 40 threadedly engaged with the inner ends of the slideways 31 and 32 and abutting the plates 37 and 38. By these means the belt conveyor 20 may be maintained at any desired tension regardless of its expansion and contraction under temperature changes.

Within the enclosure 11, above the upper section of the conveyor belt 20, there is longitudinally disposed another horizontal endless belt conveyor 41 of similar material. This conveyor is supported at its ends on rollers 42 and 43. The roller 42 is mounted on a shaft 42A which is rotatably supported in pillow block bearings 44 and 45 secured to the side walls 12 and 13, respectively.

The roller 43 is mounted on a shaft 46 which is rotatably supported in horizontally movable pillow block bearings 47 and 48 disposed in slideways 49 and 50. These slideways are provided with compression springs 51 and 52, plates 53 and 54 and set screws 55 and 56 similar to the slideways 31 and 32 and for the same purpose.

The bottom reach or section of the upper conveyor 41 is displaced vertically from the upper reach or section of the bottom conveyor 20 only a small distance and just sufficient to permit the passage therethrough of the material to be treated. This spacing is maintained by means of idler rollers 57 and 58 beneath the upper reach of the bottom conveyor, preferably in vertical alignment with the rollers 42 and 43, respectively. These idler rollers also prevent sagging of the conveyor belt and, if desired, additional idler rollers 59 and 60 may be provided to support the bottom reach of the lower conveyor, as shown.

The shaft 23 extends for a short distance on one side beyond its bearing 24 and the extended portion is provided with a pulley wheel 61 which is connected to a belt drive 62 from a suitable source of power (not shown).

Similarly, the shaft 42A extends on one side beyond one of its bearings 44 and through the side wall 12 where it is provided with a pulley wheel 63 adapted to be driven by a belt 64 from the power source. The conveyor belts 20 and 41 are driven at the same linear speed.

Across the top of the lower reach of the upper conveyor there is disposed a horizontal row of transverse tubes 65. These tubes are connected at one end to a header pipe 66 on one side of the conveyor. The other ends of the transverse tubes are closed with caps 67 and secured together with clamping bars 68.

One end of the header pipe 66 is closed with a cap 69 and the other end passes through the side wall 12 where it is connected to a source of sterilizing fluid under pressure, such as steam, ethylene oxide or other fumigants, including any of the various insecticidal, fungicidal and bactericidal materials in gas, liquid or aerosol form.

Below the bottom of the upper reach of the lower conveyor 20, there is disposed a similar horizontal row of transverse tubes 70 directly below the tubes 65. The tubes 70 are also connected to a header pipe having an inlet 71 for receiving sterilizing fluids under pressure from a source of supply, which may be either the same source as that for the tubes 65 or another source.

The tubes 65 and 70 are provided with apertures 72 and 73 facing or directed toward their adjacent conveyor reaches or sections, substantially, as shown. These apertures are preferably outwardly flared or chamfered to direct fluid emerging therefrom at a wide angle and spread it uniformly over material disposed therebetween. In Fig. 4, corresponding upper and lower tubes are shown in vertical alignment with each other. However, it is also within the scope of this invention to stagger one row relative to the other as illustrated in Fig. 5 which produces a more effective coverage and penetration of the sterilizing fluid.

To use the apparatus, the material to be sterilized, such as a bag 74, *or other material in a flattened spread out condition, is placed on the* top of the upper reach of the conveyor 20. As the conveyors move, the bag 74 or other material placed thereon, is carried within the enclosure

11 between the two conveyors 20 and 41 and thence through the area straddled by the tubes 65 and 70. Due to the proximity of the conveyors and the tension exerted thereon by the spring loaded rollers the bags or other material placed between these conveyors are held securely in a flat position and prevented from wrinkling or bunching as they are translated through the sterilizing region. The sterilizing fluid is, at the same time forced into the header pipes and thence proceeds into the transverse tubes from whence they emerge through the apertures 72 and 73 to contact and penetrate the material. Any fumes or noxious gases resulting from this treatment travels upwardly and out through the vent 17 in the roof of the enclosure, the upper reach of the upper conveyor being no impediment to this action since it is foraminous. The treated material emerges from the other end of the enclosure where it is removed from the conveyor or permitted to drop off into a container (not shown) placed at the end thereof.

I claim:

A sterilizer for [cloth bags] *sterilizing materials in a flattened spread out condition* comprising substantially vertical walls and an upwardly converging roof surmounting said walls, said walls and roof defining a chamber within which the (bags) *materials* are sterilized, a vertical outlet surmounting said roof for the discharge of vapor moving upwardly within the chamber, said walls having openings on opposite sides of the chamber, a foraminous belt conveyor in the chamber having horizontal upper and lower reaches projecting through said openings, said reaches extending beyond said openings on the exterior of the chamber, means on the exterior of the chamber for supporting and driving said belt conveyor and for maintaining constant tension therein, a portion of the upper reach on the exterior of the chamber being sufficiently long to support [a cloth] *the material* to be sterilized in a flattened spread out position, a second foraminous belt conveyor having upper and lower reaches wholly within said chamber and above said openings and supported directly above the first-mentioned belt conveyor, means for maintaining constant tension in said upper belt conveyor and for driving it at the same linear speed as the lower belt conveyor, the upper reach of the lower belt conveyor and the lower reach of the upper belt conveyor being separated by a space corresponding substantially to the thickness of the [bags] *spread out material* to be sterilized, a pair of parallel banks of horizontal pipes extending transversely of the belt conveyors, the pipes of one bank having each rows of downwardy directed discharge openings disposed directly above the lower reach of the upper belt conveyor and the pipes of the other bank having each rows of upwardly directed discharge openings directly below the upper reach of the lower belt conveyor, and means for transmitting a sterilizing fluid under pressure into all said pipes for discharge through said openings to [bags] *spread out material* in the said space between the reaches of the belt conveyors.

References Cited in the file of this patent or the original patent

UNITED STATES PATENTS

| Number | Name | Date |
|---|---|---|
| 592,280 | Crandall | Oct. 26, 1897 |

(Other references on following page)

UNITED STATES PATENTS

| Number | Name | Date |
|---|---|---|
| 875,389 | Theede | Dec. 31, 1907 |
| 880,713 | Blair | Mar. 3, 1908 |
| 976,001 | Schmitt | Nov. 15, 1910 |
| 1,024,012 | Matthews et al. | Apr. 23, 1912 |
| 1,231,594 | Fullard | July 3, 1917 |
| 1,527,369 | Meyer | Feb. 24, 1925 |
| 1,550,314 | Hammer | Aug. 18, 1925 |
| 1,652,654 | Wolfinger et al. | Dec. 13, 1927 |
| 1,779,152 | Wheeler | Oct. 21, 1930 |
| 1,853,335 | Cook | Apr. 12, 1932 |

| Number | Name | Date |
|---|---|---|
| 1,877,818 | Cook | Sept. 20, 1932 |
| 2,021,292 | Cook | Nov. 19, 1935 |
| 2,064,512 | Wilson et al. | Dec. 15, 1936 |
| 2,213,392 | Griffith | Sept. 3, 1940 |
| 2,401,131 | Benzel | May 28, 1946 |

FOREIGN PATENTS

| Number | Country | Date |
|---|---|---|
| 319,236 | Great Britain | Aug. 18, 1930 |
| 363,064 | Great Britain | Dec. 17, 1931 |
| 589,825 | Great Britain | July 1, 1947 |